United States Patent [19]

Hawkes

[11] 4,203,192
[45] May 20, 1980

[54] METHOD OF ANCHORING A VIBRATING WIRE INTO A HOLLOW GAUGE BODY

[75] Inventor: Ivor Hawkes, Lyme, N.H.

[73] Assignee: The United States of Americas as represented by the Secretary of the Interior, Washington, D.C.

[21] Appl. No.: 953,394

[22] Filed: Oct. 23, 1978

Related U.S. Application Data

[62] Division of Ser. No. 502,265, Sep. 3, 1974, Pat. No. 4,159,641.

[51] Int. Cl.² ............................................. B21D 39/00
[52] U.S. Cl. ....................................... 29/452; 29/520; 29/522 R; 403/278
[58] Field of Search ......................... 29/452, 520, 522; 43/42.36; 73/DIG. 1, 778, 784

[56] References Cited

U.S. PATENT DOCUMENTS

| | | | |
|---|---|---|---|
| 554,949 | 2/1896 | Nikoloff | 29/520 UX |
| 2,811,773 | 11/1957 | Baskin | 29/452 |
| 3,066,404 | 12/1962 | Jones | 29/452 |
| 3,507,070 | 4/1970 | Rossello | 43/42.36 X |
| 3,529,856 | 9/1970 | Smith et al. | 29/520 X |
| 3,626,754 | 12/1971 | Haagen et al. | 73/DIG. 1 UX |
| 3,641,865 | 2/1972 | Swindt | 29/520 X |
| 3,755,880 | 9/1973 | Simms | 29/452 |
| 3,898,163 | 8/1975 | Matt | 29/520 X |

Primary Examiner—Charlie T. Moon

Attorney, Agent, or Firm—Thomas Zack; Donald A. Gardiner

[57] ABSTRACT

A vibrating wire stress meter and the method used to clamp its wire in position. The wire is highly tensioned diametrically across the sides of a hollow metallic cylinder and held there by two anchor tubes. A wedge and platen assembly in turn hold this cylinder in a rock borehole such that small stress changes in the surrounding rock cause the diameter of the cylinder to slightly change. This cylinder variation is transmitted to and measured by the preloaded wire by noting variations in its frequency or period of vibration. To cause the wire to vibrate a coil, magnet, and yoke are used as a plural pole electromagnetic plucker.

Clamping of the wire is accomplished by highly tensioning the wire between two opposite hollow tubes that are seated in opposite aligned countersunk holes of the cylinder and then extruding the steel tubes around the wire. The wire extends through holes of those hollow tubes as well as the aligned holes in the cylinder walls which are diametrically opposite each other. A harder punch with a hole in it to fit over the wire is forced against one of the recessed tubes to cause its material to plastically flow around the wire and into the sides of the cylinder hole. By doing this to both tubes and controlling the amount of force used in the punch operation the tension in the wire can be precisely controlled.

6 Claims, 4 Drawing Figures

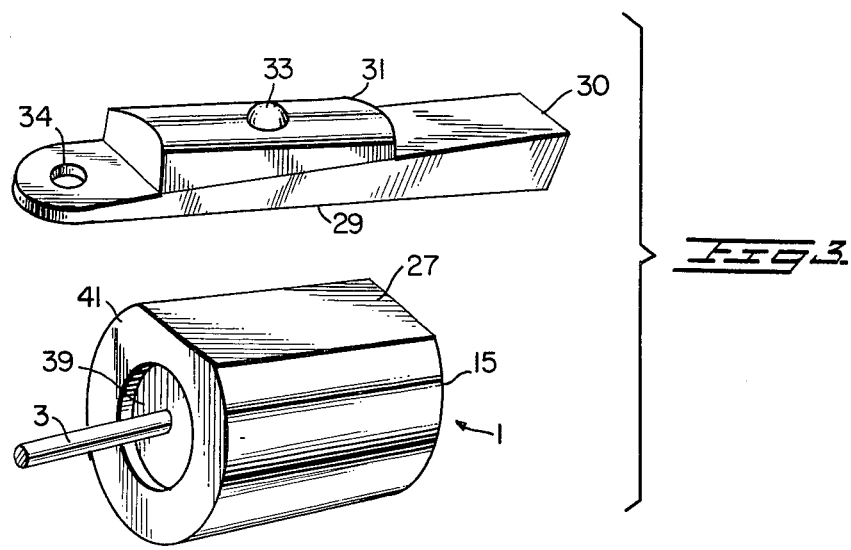
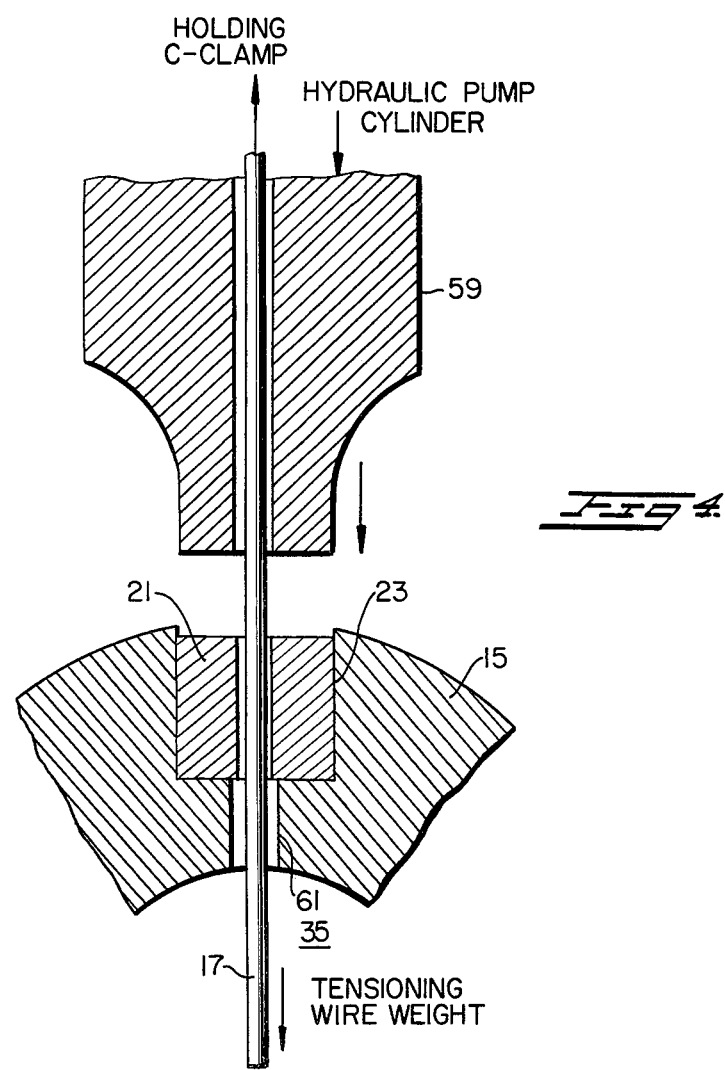

METHOD OF ANCHORING A VIBRATING WIRE INTO A HOLLOW GAUGE BODY

This is a division of application Ser. No. 502,265, filed on Sept. 3, 1974, now U.S. Pat. No. 4,159,641 issued July 3, 1979.

BACKGROUND OF THE INVENTION

1. Field of the Invention

The invention described herein relates to an improved vibrating wire stress meter and a method of clamping the vibratory wire used.

2. Description of the Prior Art

Vibrating wire stress meters have been used for some time to measure the stress in rocks or other structures by noting variations in the vibrations of the is tensioned wires. Three examples of the prior art devices can be found in the U.S. Pat. Nos. 2,306,137 to W. Pabst et al, 2,969,677 to A. V. Lewis, and 3,675,474 to R. D. Browne. In many of these inventions the wire tensioned in a longitudinal tube lengthwise of the tube to measure compressive forces on the tube ends. This type of arrangement along with the readout equipment needed to determine the frequency of vibration of the wire is usually expensive to fabricate and requires a knowledge of the modulus of the surrounding rock. My improved stress meter tensions the wire generally perpendicular of the tube's length to provide a unidirectional measurement of the compressive forces on the tube's outer surface. This construction allows the fabrication of a very stable, sensitive, simple, inexpensive, and rugged gauge whose operation is appreciably unaffected by changes in the surrounding borehole rock modulus. It does this without relying on a voltage source or value of the resistance from a connecting cable.

Another problem encountered in constructing vibrating wire stress meters is firmly anchoring the tensioned wire at its two ends. To allow for accurate readings in the vibrations it is necessary to precisely tension the wire. My invention not only provides for a precise tensioning of the wire but does so with a minimum of machining of the cylinder body. It also provides a water tight seal to the environment. As such it eliminates the use of screws, and the like, as anchoring devices which suffer from lack of accuracy and water tightness as well as requiring space for screw clamps.

SUMMARY OF THE INVENTION

In a vibrating wire stress meter a wire is tensioned and transversely clamped across the diameter of its tubular housing. Within the housing a magnetic coil attached to a readout meter at one end is used to pluck and thereby vibrate the wire at a known frequency of vibration. A wedging apparatus can be used to fix the housing within a borehole drilled in rock. To clamp the ends of the tensioned wire within two aligned holes of the housing the wire is first placed to extend through both holes and then tensioned. When in such a position two small tubes are placed over the two ends of the wire outside of the housing and each are accurately punched into recessed protions of countersunk housing holes to become extruded therein. This controlled punching force can, as a result, be used to precisely tension the wire.

The primary object of this invention is an improved stress meter. Another principle object is an improved method of clamping the vibrating wire used in a stress meter.

BRIEF DESCRIPTION OF THE DRAWINGS

FIG. 3 is an assembled view of the stress meter.

FIG. 4 is an enlarged cross-sectional view of one clamped end, immediately before punching and extruding takes place.

In FIG. 1 the vibrating wire meter 1 is shown in situ in a mine. It is connected by electrical cable 3 to a readout meter 5. The stress meter is rigidly fixed in the borehole 7 of the surrounding rock 9 by a wedge assembly 11. Presently tools allow the meter to be set into boreholes to depths ranging from 1½ inches to about 100 feet. An operator located in the mined out portion 13 is able to connect and/or disconnect a readout meter 5 via cable 3 to the meter. Readings on the readout meter are given in terms of the inverse frequency or period of the unknown signal and are displayed to four place accuracy to within one part in $10^5$ (the number of cycles of a high frequency oscillator within the readout unit). This readout meter per se forms no part of this invention. Details on one working embodiment that can be used with this invention can be found in the commonly assigned copending application filed Aug. 7, 1974, having Ser. No. 495,347, now U.S. Pat. No. 3,889,525, issued June 17, 1975, invented by William V. Bailey, entitled "Vibrating Wire Meter". In an exploded cross-sectional view taken along the longitudinal center line of the meter (FIG. 2), the hollow cylindrical steel gauge body 15 houses the vibrating wire 17 that is rigidly held therein by two capillary hollow tube clamps 19 and 21. In my preferred embodiment the gauge cylinder is made from 4140 steel, heat treated to Rockwell 45, having a yield strength of 160,000 pounds per square inch (psi) and an ultimate strength of 200,000 psi, the wire of steel having an ultimate strength of 420,000 psi; and the tubes from stainless steel 316 series having a yield strength between 38,000 to 55,000 psi. The wire extends through two aligned countersunk holes in the gauge body such that it is generally perpendicular to the longitudinal extent of the body and free to vibrate within the body's hollow interior. The top portion 27 of the housing is flattened such that it can complimentarily engage the flattened undersurface 29 of the wedge 30 forming part of the wedge assembly 11. The upper platen 31 and the hollow shear rivet 33 that joins the platen and wedge form the rest of the assembly. When it is desired to insert the meter in a borehole as in FIG. 1, the thin edge of the wedge is located so as to face towards the borehole opening and the wedge's flat undersurface 29 touches the top 27 of the gauge body. The platen is riveted to the upper surface of the wedge. A setting tool head (not shown) is used to carry the meter, wedge, and platen down the borehole and also to grip the wedge and pull it between the meter and platen. Front wedge hole 34 is used in this operation. This pulling motion breaks the hollow rivet 33 to firmly wedge the meter and wedge assembly in the borehole.

Figure 1:
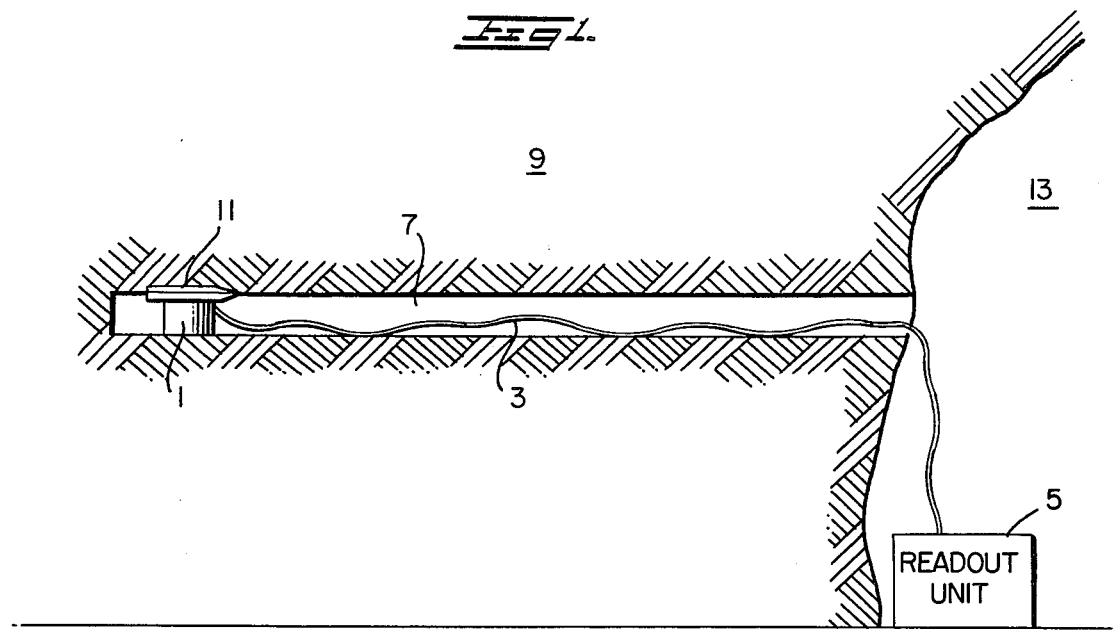
FIG. 1 Illustrates the vibrating wire stress meter in situ in a mine borehole.

Inserted within the hollowed out cylindrical portion 35 of the body 15 is an actuating mechanism 37 to pluck and sense the vibration of the vibrating wire 17. This mechanism's rear end cap portion 39, when inserted in the hollow gauge body, is slightly indented from the rear surface 41 of the body and its forward end has a hole 42 to receive the vibrating wire 17. The basic components of the actuating mechanism include its housing, the cable 3, the two neoprene sealing O-rings 43, cable clamp 45, potting compound 47, thermistors 49, wire coil 51, magnet 53, yoke 55, end cap 39 of the assembly's body, roll pin 57 to secure the assembly to the gauge body 15 when in hole 44, and the adhesive foil disc 60. The coil in conjunction with its magnet enables the wire to be vibrated. The two end legs of the U-shaped carbon steel yoke surround the coil and magnet. The magnet and coil with the yoke act as a three pole electromagnet and complete the magnetic path from the wire to the magnet. Cable 3 transmits a modulated on and off power signal from an external source (readout meter) to the coil to generate a magnetic field in the magnet to thereby pull the wire towards the magnet and then release it.

The functions of the other components of the actuating mechanism are straight forward. The O-rings seal the assembly in the gauge or meter body 15; the potting compounds encapsulates the electrical components for protection and easy assembly into the body; the end cap protects one end of the electrical package; the foil disc protects the other end of the same package and allows the placement of indicia for identification of the unit. The thermistors 49 are used to measure temperature to enable the meter readings to be corrected for differential thermal effects between the rock and meter. The particular type of thermistor used in our preferred embodiment was manufactured by Fenwall Electronics, Framingham, Mass., and had Model No. UUA32J3.

The vibrating wire 17 is a high tensile steel music wire sometimes referred to as piano wire. Its ultimate tensile strength is usually around 420,000 psi and its vibratory length about 0.78 inches and its cross-sectional diameter about 0.009 inches. Variations in dimensions and strength are, of course, possible. Initially, the wire before it is clamped at its ends in the extrusion process to be described hereafter is subjected to about 200,000 psi—the peak tensile stress it is ever under.

When stress changes occur in the surrounding rock they cause a small change in the diameter of gauge cylinder body 15. Since the wire is anchored in this body these changes will be transmitted to the preloaded wire. The wire's natural frequency (f) or period T of vibration and its stress and strain are given by:

$$f = \frac{1}{T} = \frac{1}{2l}\sqrt{\frac{\sigma g}{\rho}} = \frac{1}{2l}\sqrt{\frac{E\epsilon g}{\rho}} \quad (1)$$

where l, E, and $\rho$ are the vibratory length, modulus of elasticity and density of the wire, respectively. The letter g represents the gravitational constant and $\sigma$ and $\epsilon$ the wire stress and strain. A more meaningful expression than (1) for our purposes is one that gives the wire deformation $\Delta$. This is given by:

$$\Delta = 4l^3 \rho f^2 / Eg \quad (2)$$

One working embodiment would result in $\Delta$ for equation (2) being $4.636 \times 10^{-11}$ in./T$^2$ when $E = 30 \times 10^6$ psi, $l = 0.78$ inches, $g = 386$ in./sec.$^2$ and $\rho = 0.283$ lb./in$^3$. As will be discussed hereafter, T is the period of wire vibration and also the four digit meter reading which is displayed.

The basic theory of operation of vibrative wire gauges is well known. The coil has current flowing through it to cause its associated magnet to send out a magnetic flux field which cuts into the adjacent tensioned steel wire. To achieve the desired result the wire, coil and magnet geometry are all very important. To excite the wire at its natural frequency the magnetic field pulls the tensioned wire approximately at its midpoint towards the magnet and then, due to the modulated current in the coil windings, returns it to its prior unplucked state. The change in inductive reactance of the coil is directly related to the work (force times deflection) done by the flux linkage on the wire. Generally, this is maximized when the flux linkage is as great as possible (shaped pole pieces, small wire-magnet distance, and large diameter wire) and the wire deflection is as great as possible.

The same driving coil and magnet can be used to sense or pick up the vibrations of the wire. This occurs when the magnet induces a local magnetic field in the wire. As the wire moves it appears as a changing magnetic field to the nearby coil thereby inducing a voltage in it. This usable induced voltage ranges from 0.1 to 20 millivolts depending upon the vibration amplitude of the wire, the strength of the magnet and the coil, and the wire stand-off distance.

To use the gauge the wire is plucked electromagnetically for a number of cycles at its natural resonance frequency. These pluck signals are generated by a counter circuit and solid state driving circuit in the readout unit that is connected via cable 3 to the coil 51. The frequency of these plucking signals is determined by a readout voltage controlled oscillator (VCO) whose nominal free running frequency varies as the operator turns a dial on the readout unit's face. Generally, the VCO running frequencies range from 2000 to 8000 hertz, the detection range of the instrument. Then an amplifier listens for the return signal for a period of time. Because the return signal appears as a damped sinusoid following the resonance excitation, the signal will eventually damp out to a point where it falls below the detection threshold. In one working embodiment of the stress meter the detectable cycles range up to about 700; however, only the first 300 or so were free enough from noise to be usable.

In the previously mentioned embodiment of the readout meter digital logic is used to count and display the unknown frequency (in terms of a period) for a known period of time but the count is limited to a discrete number of cycles. For example, say 6667 cycles are counted in one second, the frequency of the signal is 6667 hertz accurate to approximately one point in $10^5$. Had the known count time been only 0.01 seconds then the count would have been 66 cycles which gives an accuracy of the frequency measurement of only one part in $10^3$. Thus to count cycles and display them accurately in terms of frequency, the counting time should extend over at least one second. Rather than do this and still achieve four place accuracy when only 250 cycles are available to be counted, an alternative system has been used. This alternate is to count exactly 100 cycles of the unknown frequency received from the gauge and at the same time count the number of cycles from a stable $10^5$ hertz high frequency oscillator. The number of counts from the oscillator is then displayed as the digital readout. For example, if it takes 0.015 seconds to count 100 cycles at 6667 hertz then during this same time frame 1500 cycles of the reference time base oscillator are counted since it is counting 100 times as fast.

Thus the displaced number 1500 represent inverse frequency (1/f) or the period of the unknown signal. With an accuracy of one part in $10^5$ in the oscillator four place accuracy can be obtained for the wire period. This reasoning explains why the vibrating wire readout meter displays its digital readings as a period rather than as straight frequency.

Figure 2:
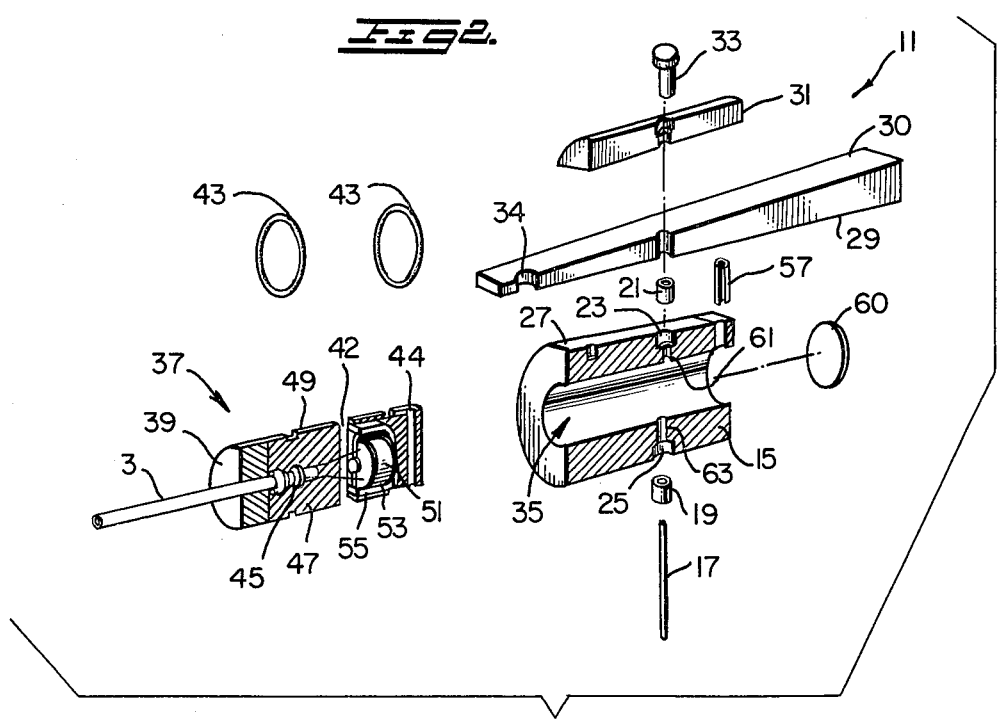
FIG. 2 is a cross-sectional exploded view of the meter.

FIG. 3 illustrates the assembled FIG. 2 stress meter with the wedge assembly above it. The end cap 39 is inserted in the hollow opening 35 (FIG. 2) such that it is slightly vertically recessed from the surface 41. Power and sensing cable 3 extends from the center portion of the actuating mechanism to the readout meter. When placed in a borehole the two flattened surfaces—surface 27 of the meter and under surface 29 of the wedge—engage each other to fixedly secure the complete assembly therein. The upper surface of the platen and the surface 27, as well as the hollow hole 35, would all be generally parallel in such a state. The dimensions of the assembled unit of FIG. 3 are about 1.5 inches long by 1.125 inches in diameter.

FIG. 4 is an enlarged cross-sectional view of a portion of the gauge body 15 where it clamps the vibrating wire 17. The lower hole in the gauge body is similarly configured and the method to be described to extrude tube 21 into the upper countersunk hole is equally applicable to extruding tube 19 into the lower countersunk hole. Each of these holes has a smaller and larger diameter outwardly facing portion 23 into which the stainless steel tube clamp 21 of approximately the same diameter is seated. The wire extends through the larger diameter hole portion and its encircling tube and also through the smaller hole section 61 into the hollow gauge body volume 35. The lower end of the same wire extends into smaller hole section 63 (see FIG. 2) and then out the larger hole portion 25 into which tube 19 is seated. Thus the two countersunk holes are used as seats for the tubes by allowing the tubes to be seated in their larger diameter portion but preventing their passage in the smaller diameter inner sections. To anchor these tubes to the wire the wire is clamped above an hydraulic cylinder attached to punch 59 to first hold the wire vertically. About 12½ pounds are hung from the lower end of the wire to stress it to roughly 200,000 psi. The upper hollow punch 59 is pumped down to contact the tube's upper surface with around 1550 pounds of force for 30 seconds. This results in the relatively soft steel material (38–55,000 psi yield) of the tube 21 being extruded into upper hole portion 23 and gripping the wire. Next, the upper clamp is removed so that the wire and the 12½ pound weight are supported solely by the extruded tube clamp. A lower hydraulic cylinder pump and a second tube 19 now are utilized to extrude this lower tube into larger hole portion 25. As this second lower tube grips the wire and supports the weight, the tension in the length of the wire inside the hollow gauge volume 35 is reduced. When the tension inside the gauge body drops to around 150,000 psi the readout inside the gauge body drops to around 150,000 psi the readout meter 5 starts to display the period readings. From this point on the tube clamping pressure can be controlled in conjunction with the meter readings. Actual settings have been made to within ±10 units of the required meter readings by exercising care and experience. After the proper setting is obtained, the 12½ pound weight is increased to around 25 pounds, which breaks the wire at its lower tube 19.

After a few days when the tension has initially been set the meter readings for some gauges show a slight decrease (i.e. The wire tension increases). This is thought to be due to viscoelastic recovery of the clamping tubes after the high extrusion stresses. Not all gauges respond in this way. Further readings a few days after this noted decrease show a settling down to a steady state condition which remains unchanged.

It is important to select the strengths of the materials making up the tubes, gauge cylinder body and wire with care. It is important that the wire have very high strength to avoid stress relaxation under high stresses. The tubes should have a much lower yield strength than the body or wire so that they can be extruded into the gauge body holes as the punch compresses them. One additional consideration for the gauge body is that it be sufficiently elastic over its working range. The Rockwell 45 hardness 4140 steel insures this type of elastic behavior.

What I have achieved by the foregoing disclosure is to construct a simple, durable, inexpensive, sensitive, wire stress meter that is impervious to most of the normal environmental conditions it would usually be used under, including water filled boreholes. The unique method of clamping its vibrating wire insures a constant and accurate readout of the detected vibrations.

The stress meter described in this disclosure is unidirectional in its measuring capabilities. Generally to get an accurate picture of what is occurring three meters whose wires are set 120 degrees apart when viewed directly down the borehole, are used. In this way when stresses act on the gauge bodies from different directions changes in the resultant stresses can be detected with a high degree of accuracy.

None of the specifically disclosed features should be used to limit the scope of my invention which is to be measured only by the claims that follow.

I claim:

1. A method of anchoring a vibrating wire into a hollow gauge body comprising the steps of:
   inserting the wire into two aligned countersunk holes in and through the gauge body;
   tensioning the wire;
   placing an anchoring tube over one end of the wire on the outside of the gauge body;
   punching the tube into one hole of the gauge body against an end wall of the countersunk portion to extrude the tube over the wire and into the sides of the hole;
   placing a second anchoring tube over the other outside end of the wire in the other hole; and
   punching the second tube into its second hole against an end wall of the countersunk portion such that it is extruded over the wire and into the hole until a desired wire tension is reached.

2. The method of claim 1 wherein said wire tensioning step is accomplished by clamping the wire near its upper end outside the gauge body and placing a weight near its lower end.

3. The method of claim 1 wherein said punching steps are accomplished by pumping an hydraulic cylinder attached to a punch.

4. The method of claim 3 wherein punching steps are accomplished by surrounding the wire with a hollow punch and forcing the punch under pressure against the surface of the tube and into its corresponding gauge hole.

5. The method of claim 1 wherein the anchoring tubes are placed on the wire ends prior to tensioning the wire; and the tensioning step is accomplished by clamping the wire near its upper end and attaching a weight to the wire's lower end.

6. The method of claim 4 wherein the second anchoring tube is the lower tube and is punched after the first tube is sufficiently punched to firmly grasp the upper end of the wire.

* * * * *